(12) United States Patent
Gruijl

(10) Patent No.: US 7,899,955 B2
(45) Date of Patent: Mar. 1, 2011

(54) ASYNCHRONOUS DATA BUFFER

(75) Inventor: Robert Gruijl, San Francisco, CA (US)

(73) Assignee: NXP B.V., Eindhoven (NL)

( * ) Notice: Subject to any disclaimer, the term of this patent is extended or adjusted under 35 U.S.C. 154(b) by 220 days.

(21) Appl. No.: 11/996,312

(22) PCT Filed: Jul. 21, 2006

(86) PCT No.: PCT/IB2006/052514

§ 371 (c)(1),
(2), (4) Date: Jan. 21, 2008

(87) PCT Pub. No.: WO2007/010502

PCT Pub. Date: Jan. 25, 2007

(65) Prior Publication Data

US 2008/0201499 A1    Aug. 21, 2008

Related U.S. Application Data

(60) Provisional application No. 60/702,053, filed on Jul. 22, 2005, provisional application No. 60/735,456, filed on Nov. 10, 2005.

(51) Int. Cl.
  G06F 13/00  (2006.01)
  G06F 3/00   (2006.01)
  G06F 5/00   (2006.01)
(52) U.S. Cl. .............................. 710/35; 710/52; 710/57
(58) Field of Classification Search .................... 710/35
  See application file for complete search history.

(56) References Cited

U.S. PATENT DOCUMENTS 5,084,837 A * 1/1992 Matsumoto et al. ........... 710/38
5,781,802 A   7/1998 Cassetti
5,884,099 A * 3/1999 Klingelhofer ................. 710/52
5,898,893 A * 4/1999 Alfke ........................... 710/57
5,956,748 A * 9/1999 New ............................ 711/149
6,055,285 A * 4/2000 Alston ........................ 375/372
6,058,439 A * 5/2000 Devereux .................... 710/52
6,141,691 A * 10/2000 Frink et al. ................. 709/233
6,268,929 B1 * 7/2001 Ono ............................ 358/1.6

(Continued)

OTHER PUBLICATIONS

Chen, J.; Burns, A.; , "Asynchronous data sharing in multiprocessor real-time systems using process consensus," Real-Time Systems, 1998. Proceedings. 10th Euromicro Workshop on , vol., No., pp. 2-9, Jun. 17-19, 1998 http://ieeexplore.ieee.org/stamp/stamp.jsp?tp=&arnumber=684918&isnumber=15022.*

(Continued)

Primary Examiner—Tariq Hafiz
Assistant Examiner—Dayton Lewis-Taylor

(57) ABSTRACT

The present invention relates to an asynchronous data buffer for transferring m data elements of a burst-transfer between two asynchronous systems. The asynchronous data buffer comprises a data memory for storing m data elements of a data burst and a valid bit memory for storing m input valid bits corresponding to the m data elements. Input control logic circuitry generates the m input valid bits and controls storage of the same and the m data elements. After storage of the m input valid bits an input control signal is provided for inverting the input valid bits of a following data burst. Therefore, after each burst-transfer of m data elements the input valid bit is inverted, automatically rendering all data elements of a previous burst-transfer invalid.

26 Claims, 3 Drawing Sheets

U.S. PATENT DOCUMENTS

| | | | |
|---|---|---|---|
| 6,516,420 | B1 | 2/2003 | Audityan et al. |
| 6,519,688 | B1 * | 2/2003 | Lu et al. ................... 711/167 |
| 6,788,588 | B2 * | 9/2004 | Nagai et al. ............ 365/189.05 |
| 6,880,050 | B1 * | 4/2005 | Korger ...................... 711/156 |
| 2003/0074593 | A1 * | 4/2003 | Carpenter et al. ........... 713/400 |

OTHER PUBLICATIONS

Chen, J.; Burns, A.;, "Loop-free asynchronous data sharing in multiprocessor real-time systems based on timing properties," Real-Time Computing Systems and Applications, 1999. RTCSA '99. Sixth International Conference on , vol., No., pp. 236-246, 1999 http://ieeexplore.ieee.org/stamp/stamp.jsp?tp=&arnumber=811236&isnumber=17590.*

Ferretti, M.; Beerel, P.A.;, "High performance asynchronous design using single-track full-buffer standard cells," Solid-State Circuits, IEEE Journal of , vol. 41, No. 6, pp. 1444-1454, Jun. 2006 http://ieeexplore.ieee.org/stamp/stamp.jsp?tp=&arnumber=1637608&isnumber=34322.*

Yantchev, J.T.; Huang, C.G.; Josephs, M.B.; Nedelchev, I.M.;, "Low-latency asynchronous FIFO buffers," Asynchronous Design Methodologies, 1995. Proceedings., Second Working Conference on , vol., No., pp. 24-31, May 30-31, 1995 http://ieeexplore.ieee.org/stamp/stamp.jsp?tp=&arnumber=514639&isnumber=11406.*

Pham, G.N.; Schmitt, K.C.;, "A high throughput, asynchronous, dual port FIFO memory implemented in ASIC technology," ASIC Seminar and Exhibit, 1989. Proceedings., Second Annual IEEE , vol., No., pp. P3-1/1-4, Sep. 25-28, 1989 http://ieeexplore.ieee.org/stamp/stamp.jsp?tp=&arnumber=123184&isnumber=3489.*

W. Rogiest, K. Laevens, D. Fiems, H. Bruneel, a performance model for an asynchronous optical buffer, Performance Evaluation, vol. 62, Issues 1-4, Performance 2005, Oct. 2005, pp. 313-330 http://www.sciencedirect.com/science/article/B6V13-4GV8SXR-5/2/33a36d65a5a1e1951140a15b282975f4.*

* cited by examiner

ASYNCHRONOUS DATA BUFFER

This application claims priority of an earlier filed application Ser. No. 60/702,053 titled, "Efficient Asynchronous Data Buffer Implementation," filed on Jul. 22, 2005, and is incorporated by reference in its entirety.

This invention relates generally to interfacing techniques between two systems, and in particular to an asynchronous data buffer for data transfer between two systems linked to asynchronous clock domains.

Even in a simple computer, many different components communicating with one another are linked to different clock domains, i.e. they are synchronized to different clocks having different frequencies. For example, a CPU is operating at a substantially higher frequency than other components of the computer such as a disc drive. When two components or systems are linked to different clock domains data communication therebetween is realized either synchronously or asynchronously. In a synchronous data transfer the clocks of two systems are synchronized to a third clock domain. However, the strong linkage of the clock domains in the synchronous data transfer restricts the design of high performance communication links. Asynchronous data transfer provides more design flexibility by obviating the strong linkage of the clock domains.

Unfortunately, asynchronous interfaces also have disadvantages such as extra latency for data synchronization and increased probability of data corruption during data transfer. Data corruption occurs because of metastability across an asynchronous interface. State of the art concepts are two-stage synchronizers and two-phase handshake methods. However, these concepts have an undesirable trade-off between performance and reliability, or use complicated synchronization logic substantially increasing the complexity of the system. Recent technologies utilize a data valid bit to reduce the risk of a metastable condition. In U.S. Pat. No. 6,516,420 Audityan et al. teach valid bits used to synchronize individual data elements, which are reset after each transaction is done using a data sampler. However, the resetting of the valid bits substantially limits efficiency and data throughput since a data buffer memory location is first available after resetting of the valid bit. The same problem arises in the method taught by Carpenter et al. in U.S. patent application 20030074593 that requires clearing of the valid bits once used.

It would be desirable to provide an asynchronous data buffer that is more efficient and has a higher data throughput.

It is, therefore, an object of the invention to provide an asynchronous data buffer that is more efficient and has a higher data throughput by substantially reducing latency.

It is further an object of the invention to provide an asynchronous data buffer that does not require resetting or clearing of the valid bit.

In accordance with the present invention there is provided an asynchronous data buffer for transferring m data elements of a burst-transfer between two asynchronous systems. The asynchronous data buffer comprises a data input port for receiving the m data elements of a data burst from a sending system and a data memory in communication therewith for storing the m data elements, wherein each data element is stored at a predetermined address location. In a valid bit memory m input valid bits are stored, wherein each input valid bit is stored at a predetermined address location corresponding to the predetermined address location of a respective data element. Input control logic circuitry in control communication with the data memory and the valid bit memory determines the address locations, creates the m input valid bits, and provides an input control signal for inverting the input valid bits of a following data burst. Output control logic circuitry in communication with the data memory, the valid bit memory and a valid bit output port, the output control logic circuitry controls reading of the m data elements and provision of the same to a receiving system, creates m output valid bits based upon the m input valid bits and an output control signal, the m output valid bits for provision to the receiving system, and inverts control logic circuitry in control communication with the data memory and the valid bit memory.

Exemplary embodiments of the invention will now be described in conjunction with the following drawings, in which.

Figure 1:
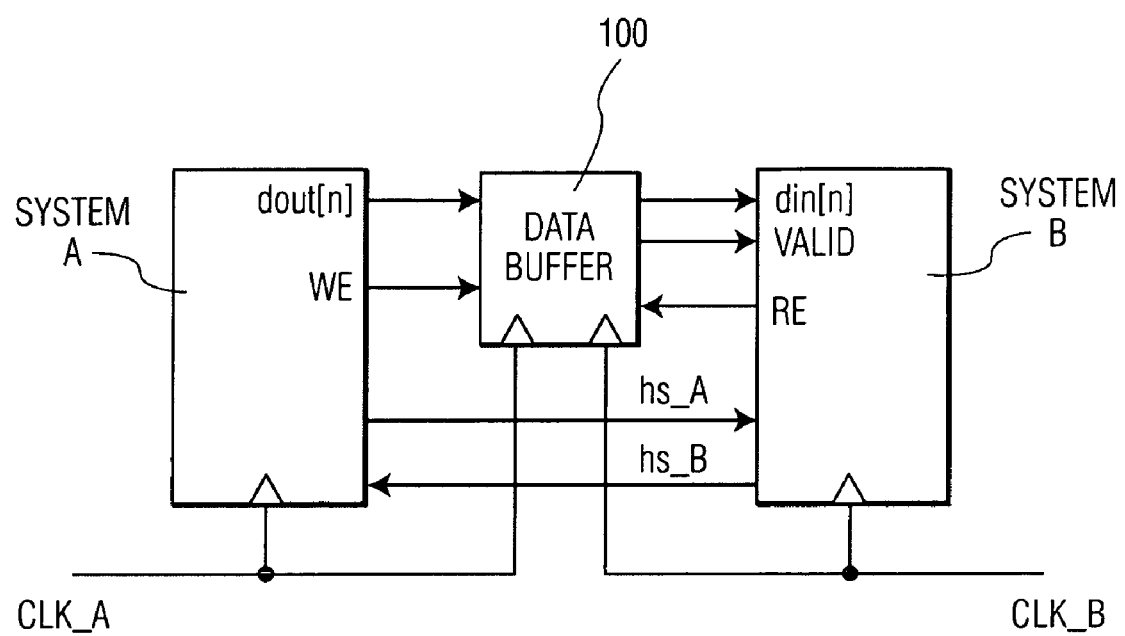
FIG. 1 is a simplified block diagram illustrating communication between two asynchronous systems using an asynchronous data buffer according to the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

In order to provide a better understanding of the asynchronous data buffer according to the invention and its operation, communication between two systems using an example embodiment of the asynchronous data buffer will be described in the following with reference to FIG. 1. In order to avoid data loss during data transfer between a sending system A and a receiving system B that are linked to two different clock domains—clock signals clk_A and clk_B, respectively—a handshake protocol is implemented. Before the sending system A starts sending data to the receiving system B, the receiving system B needs to be ready to receive the data, or at least a portion of the data if not all data are lost. As shown in FIG. 1, the sending system A requests a data transfer by sending a handshake signal hs_A and waits with the data transfer until the receiving system B has acknowledged that it is ready for receiving the data by sending handshake signal hs_B to the sending system A. To increase data throughput between the two systems, burst-transfers are used, i.e. multiple data elements are sent when a data transfer has been acknowledged by the receiving system B instead of performing a handshake for every individual data element. In this case, the receiving system B acknowledges that it is ready to receive m n-bit data elements when it sends the handshake signal hs_B. In order to prevent data loss when the clock domain clk_A of the sending system A has a higher frequency than the clock domain clk_B of the receiving system B, for example, in a data transfer between a CPU and a peripheral device such as a disk drive, an asynchronous data buffer 100 is interposed between the sending system A and the receiving system B. After the receiving system B acknowledges that it is ready to receive data, the sending system A transfers the m data elements to the data buffer 100 for storage in memory thereof by sending for each of the m data elements a write enable signal WE and the data element on dout[n]. To avoid an increase of latency of the burst-transfer with an increasing number m of data elements per burst-transfer, the sending system A and the receiving system B need to access the data buffer 100 simultaneously, i.e. the receiving system B does not wait reading the data elements until the sending system A has completed writing the m data elements into the memory of the data buffer 100. However, since two systems linked to different clock domains are operating on the same memory, data-loss or data-corruption will likely occur due to metastability problems. This problem is overcome by creating a valid bit each time a data element is stored in the memory of the data buffer indicating to the receiving system B that the stored data element belongs to the current burst-transfer of m data elements as acknowledged by the handshake signals hs_A and hs_B.

Figure 2:
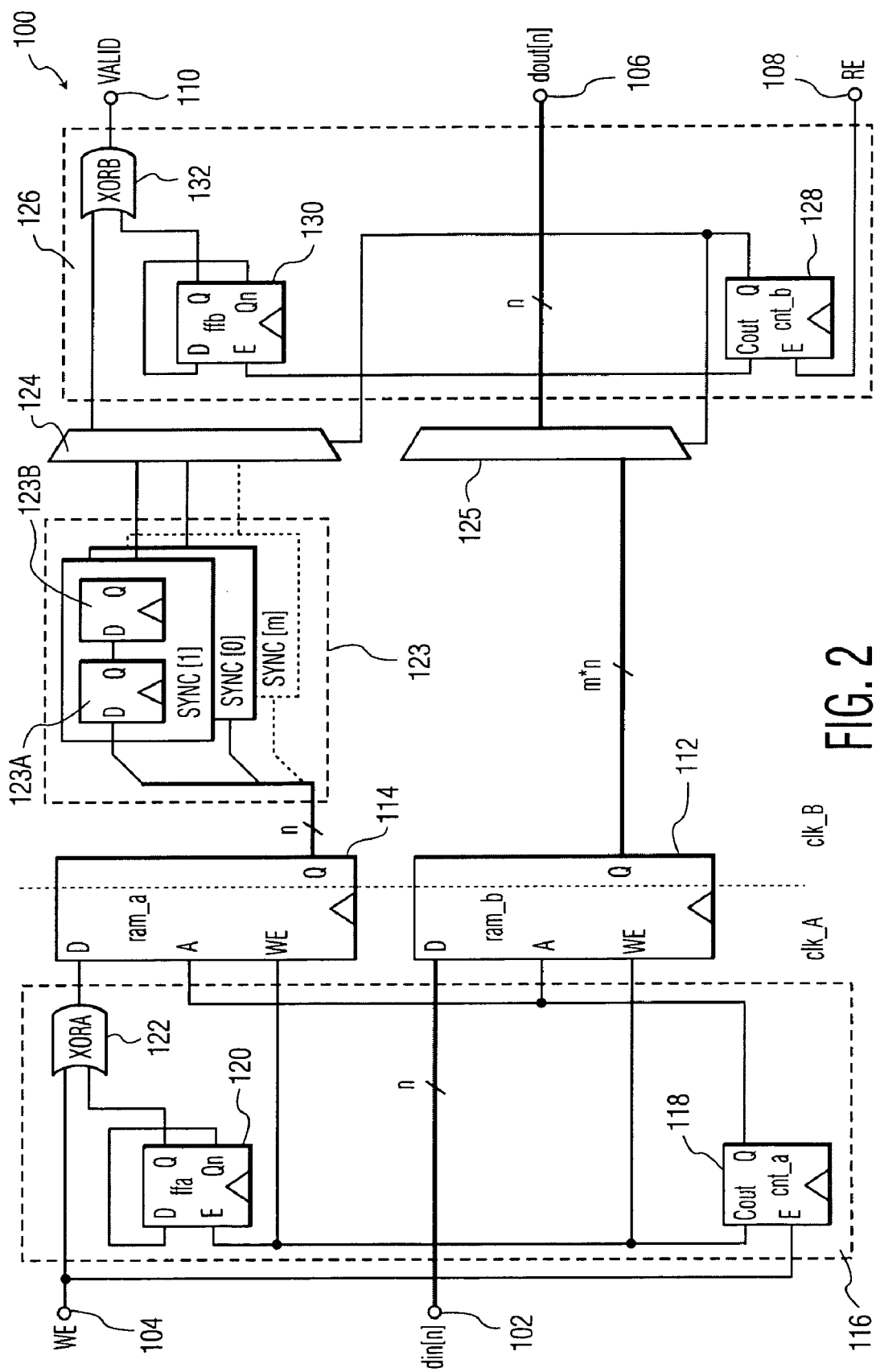
FIG. 2 is a simplified block diagram illustrating an example embodiment of the asynchronous data buffer according to the invention; and, FIG. 3 is a simplified flow diagram illustrating the data transfer using the asynchronous data buffer according to the invention.

FIG. 2 illustrates in a block diagram an example embodiment of an asynchronous data buffer 100 according to the invention. The data buffer 100 comprises data input port 102 and write enable input port 104 for being connected to the sending system A, and data output port 106, read enable input port 108 and valid bit output port 110 for being connected to the receiving system B. As indicated by the vertical dashed line in FIG. 2, the data buffer 100 comprises two portions: a data input portion—left hand side—for being connected to the sending system A and, therefore, for being linked to the clock domain clk_A; and a data output portion—right hand side—for being connected to the receiving system B and, therefore, for being linked to the clock domain clk_B. The data input port 102 is connected to a data input port D of data memory 112—preferably a RAM having storage space for m data elements of n bits each, i.e. a maximum possible size of a burst-transfer between the systems A and B. The write enable input port 104 is connected to a write enable input port WE of the data memory 112, to a write enable input port WE of valid bit memory 114—preferably an m-bit RAM, and to input control logic circuitry 116. The input control logic circuitry 116 is connected to an address input port A of the data memory 112 and to an address input port A of the valid bit memory 114 for provision of logic signals thereto.

In the example embodiment the input control logic circuitry 116 comprises an input counter 118 such as a binary address counter and an input valid bit generator, which is a combination of an input toggle flip-flop 120 with an input XOR gate 122. The input counter 118 comprises an E input port connected to the write enable input port 104, a Q output port connected to the address input ports A of the memories 112 and 114, respectively, and a C output port connected to an E input port of the input toggle flip-flop 120. The input XOR gate 122 comprises a first and a second input port connected to the write enable input port 104 and a Q output port of the toggle flip-flop 120, respectively, and an output port connected to a data input port D of the valid bit memory 114.

In operation, when a write enable signal WE is received followed by writing of a data element into the memory 112, the counter 118 is incrementing a first input logic signal and a following empty location in the memory 112 is addressed by transmitting the first input logic signal to the address input port A of the memory 112. Simultaneously, an input valid bit—a binary 0 or 1—is created in the input XOR gate 122 based on a second input logic signal received from the input toggle flip-flop 120 and the write enable signal WE, which is then stored in the valid bit memory 114 with the address location corresponding to the address location of the data element being controlled by the first input logic signal. With the write enable signal WE being always a same, preferably, binary signal 0 or 1 and the input toggle flip-flop 120 producing a same, preferably, binary signal 0 or 1 until a third input logic signal is received from the input counter 118 a same input valid bit is created. After m write enable signals WE corresponding to the m data elements have been received, the input counter 118 loops back and sends the third input logic signal to the input toggle flip-flop 120. Upon receipt of the third input logic signal the input toggle flip-flop 120 produces an inverted second input logic signal, which results in the input XOR gate 122 producing an inverted input valid bit—changing from a binary 0 to a binary 1 or vice versa. Therefore, after each burst-transfer of m data elements the input valid bit is inverted, automatically rendering all data elements of a previous burst-transfer invalid.

The data output portion of the data buffer 100 comprises valid bit synchronization circuitry 123, valid bit multiplexer 124, output data multiplexer 125, and output control logic circuitry 126. The valid bit synchronization circuitry 123 is connected to a data output port Q of the valid bit memory 114 and data input ports of the valid bit multiplexer 124, and comprises in the example embodiment m parallel two stage synchronizers synch[1] to synch[m]—one synchronizer for each of the m input valid bits corresponding to the m data elements—with each two stage synchronizer comprising two flipflops 123A and 123B connected in series, and with the first flipflop 123A for being linked to the clock domain clk_A of the sending system A and the second flipflop 123B for being linked to the clock domain clk_B of the receiving system B. In operation, the valid bit synchronization circuitry 123 synchronizes the input valid bits to the clock domain clk_B of the receiving system B. Data input ports of the valid bit multiplexer 124 are connected to the valid bit synchronization circuitry 123, while a data output port and a control logic input port are connected to the output control logic circuitry 126. In dependence upon a first output logic signal received from the output control logic circuitry 126 the valid bit multiplexer 124 transfers an input valid bit from one of the m synchronizers synch[1] to synch[m]. Data input ports of the output data multiplexer 125 are connected to data output port Q of the data memory 112, a data output port of the output data multiplexer 125 is connected to the data output port 106, and a control logic input port is connected the output control logic circuitry 126. In dependence upon the first output logic signal received from the output control logic circuitry 126 the data multiplexer 125 transfers one of the m data elements from a corresponding address location in the data memory 112.

In the example embodiment the output control logic circuitry 126 is of a similar structure as the input control logic circuitry 116, and comprises an output counter 128 such as a binary address counter and a combination of an output toggle flip-flop 130 with an output XOR gate 132. The output counter 128 comprises an E input port connected to the read enable input port 108, a Q output port connected to the control logic input ports of the multiplexers 124 and 125, respectively, and a C output port connected to an E input port of the output toggle flip-flop 130. The output XOR gate 132 comprises a first and a second input port connected to the data output port of the valid bit multiplexer 124 and a Q output port of the output toggle flip-flop 130, respectively, and an output port connected to the valid bit output port 110.

In operation, when a read enable signal RE is received and, therefore, a data element is read from the memory 112, the output counter 128 is incrementing a first output logic signal and a following location in the memory 112 is addressed by transmitting the first output logic signal to the control logic input port of the data multiplexer 125. Simultaneously, an output valid bit—a binary 0 or 1—is created in the XOR gate based on a second output logic signal received from the output toggle flip-flop 130 and the input valid bit received from the valid bit multiplexer 124, which is then transferred to the valid bit output port 110, with provision of the input valid bit being controlled by the first output logic signal provided to the valid bit multiplexer 124. With the input valid bit being a same for m data elements of a burst transfer and the output toggle flip-flop 130 producing a same, preferably, binary signal 0 or 1 until a third output logic signal is received from the output counter 128 a same output valid bit is created. After m read enable signals RE corresponding to m data elements have been received, the output counter 128 loops back and sends the third output logic signal to the output toggle flip-flop 130. Upon receipt of the third output logic signal the output toggle flip-flop 130 produces an inverted second output logic signal. Receiving an inverted input valid bit and the inverted second output logic signal, the output XOR 132 produces in a following burst transfer a same output valid bit for provision to the receiving system B. Therefore, the data buffer 100 according to the invention inverts after each burst transfer of m data elements the input valid bit internally, automatically rendering all data elements of a previous burst transfer invalid, but provides a same output valid bit to the receiving system B.

Figure 3:
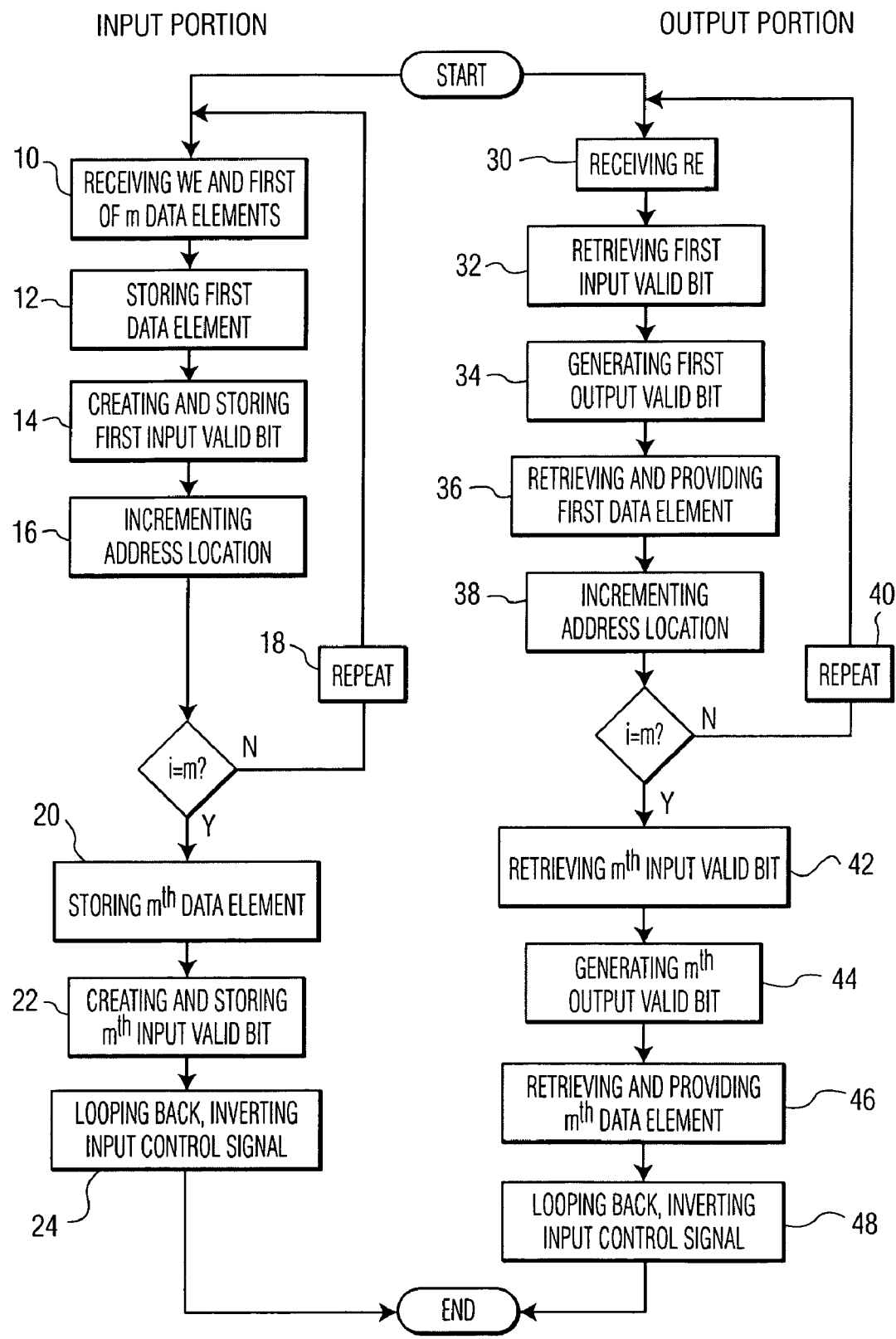

Referring to FIG. 3, a simplified flow diagram of a method for transferring m data elements of a burst-transfer using an asynchronous data buffer according to the invention is shown. In the following the method will be described in two portions related to the input and the output portion of the asynchronous data buffer. As shown in the flow diagram in FIG. 3 the two portions will be performed simultaneously once the first valid bit—indicating that the first data element of the burst-transfer has been stored in the data memory—is detected.

Referring to box 10, a first write enable signal WE and a first of m data elements of a burst-transfer are received from the sending system A. The first data element is then stored—box 12—at a first address location in the data memory 112. Using the first write enable signal WE and an input control signal, a first input valid bit is created and stored at a first address location in the valid bit memory 114—box 14. The write enable signal WE is further used for incrementing the address location—box 16. The above steps indicated by boxes 10 to 16 are then repeated until the $m^{th}$ write enable signal WE and the $m^{th}$ data element have been received—box 18. The $m^{th}$ data element is stored at the $m^{th}$ address location in the data memory 112—box 20. Using the $m^{th}$ write enable signal WE and the input control signal, an $m^{th}$ input valid bit is created and stored at the $m^{th}$ address location in the valid bit memory 114—box 22. Finally, the $m^{th}$ write enable signal WE is used to loop back to the first address location and to invert the input control signal resulting in an inverted input valid bit for the following burst-transfer—box 24.

Referring to box 30, a first read enable signal RE is received from the receiving system B. The first input valid bit is then retrieved from the first address location of the valid bit memory 114—box 32. This step is followed by the generation of a first output valid bit using the first input valid bit and an output control signal and provision of the same to the receiving system B—box 34. Upon validation of the first output valid bit the first data element is retrieved from the first address location in the data memory 112 and provided to the receiving system B—box 36. Using the first read enable signal RE the address location is incremented—box 38. The above steps indicated by boxes 30 to 38 are then repeated until the $m^{th}$ read enable signal RE has been received—box 40. The $m^{th}$ input valid bit is then retrieved from the $m^{th}$ address location of the valid bit memory 114—box 42. This step is followed by the generation of the $m^{th}$ output valid bit using the $m^{th}$ input valid bit and the output control signal and provision of the same to the receiving system B—box 44. Upon validation of the $m^{th}$ output valid bit the $m^{th}$ data element is retrieved from the $m^{th}$ address location in the data memory 112 and provided to the receiving system B—box 46. Finally, the mth read enable signal RE is used to loop back to the first address location and to invert the output control signal, resulting in a same output valid bit when processed together with the inverted input valid bit during the following burst-transfer—box 48.

The asynchronous data buffer 100 is highly advantageous by individually synchronizing data elements of a burst-transfer between two asynchronous systems with valid bits that are inverted after each burst-transfer. Therefore, the asynchronous data buffer 100 allows simultaneous access for the sending as well as the receiving system with reduced risk of metastability problems, while latency is substantially reduced by obviating the need for clearing or resetting of the valid bits. Furthermore, the asynchronous data buffer 100 is easily implemented due to a simple design having a low gate count and the substantially same design of the input control logic circuitry 116 and the output control logic circuitry 126, substantially decreasing design and manufacturing cost. Preferably, all components are integrated on a single semiconductor chip, which is facilitated by the use of same-design components for the input control logic circuitry 116 and the output control logic circuitry 126 requiring substantially same manufacturing steps. Optionally, the asynchronous data buffer 100 is integrated together with one of the systems A and B on a single semiconductor chip. For example, the asynchronous data buffer 100 is highly beneficial in system bus implementations that allow burst-transfers between two asynchronous systems. Knowing system requirements for the burst-transfer, it is possible to design the asynchronous data buffer 100 on a computer by executing commands based on the above description stored on a storage medium.

The implementation of the asynchronous data buffer 100 according to the invention has been illustrated using an example embodiment, but as is evident, is not limited thereto. There are numerous possibilities for implementing inversion of the input valid bits and generating same output valid bits. The logic circuits of the asynchronous data buffer 100 are easily adapted to produce other logic signals as input and output valid bits then the binary 0 and 1 disclosed in combination with the example embodiment. Optionally, the logic circuits of the asynchronous data buffer 100 are adapted to receive one write enable and/or read enable signal for successively writing and/or reading the m data elements controlled, for example, by the clock signals clk_A and clk_B. Furthermore, the implementation shown in FIG. 2 comprises edge triggered logic components triggered by a rising clock pulse edge, but as is evident, it is also possible to use a falling clock pulse edge.

Numerous other embodiments of the invention will be apparent to persons skilled in the art without departing from the spirit and scope of the invention as defined in the appended claims.

What is claimed is:

1. A method for transferring m data elements of a burst-transfer between two asynchronous systems, wherein m is a finite number, the method comprising:
 a) receiving from a sending system a first of the m data elements of a data burst;
 b) storing the first data element at a first address location in a data memory;
 c) creating a first input valid bit and storing it at a first address location in a valid bit memory;
 d) incrementing the first address location;

e) repeating a) to d) until a $m^{th}$ data element and a $m^{th}$ input valid bit have been stored;

f) looping back to the first address location and inverting an input control signal resulting in an inverted input valid bit for a following data burst;

g) reading the first input valid bit from the first address location of the valid bit memory;

h) creating a first output valid bit based upon the first input valid bit and an output control signal and providing the first output valid bit to a receiving system;

i) reading the first data element from the first address location of the data memory and providing the first data element to the receiving system;

j) incrementing the first address location;

k) repeating g) to j) until a $m^{th}$ data element has been read and provided to the receiving system; and, l) looping back to the first address location and inverting the output control signal resulting in a same output valid bit when processed together with the inverted input valid bit during the following data burst, wherein the receiving system and the sending system simultaneously access the data memory after storage of the first data element in the data memory.

2. The method of claim 1, wherein at least a portion of g) to l) is performed simultaneously to e).

3. The method of claim 1, and wherein c) comprises creating one of a binary 0 and 1 as input valid bit in dependence upon the input control signal.

4. The method of claim 1, and wherein a) comprises receiving a write enable signal from the sending system.

5. The method of claim 4, and wherein c) the input valid bit is created using the write enable signal and the input control signal.

6. The method of claim 4, and wherein d) the address location is incremented in dependence upon the write enable signal.

7. The method of claim 6, and wherein f) is performed in dependence upon the $m^{th}$ write enable signal.

8. The method of claim 1, and comprising g) synchronizing transfer of the input valid bit to a clock domain of the receiving system.

9. The method of claim 4, and wherein g) comprises receiving a read enable signal from the receiving system.

10. The method of claim 9, and wherein j) the address location is incremented in dependence upon the read enable signal.

11. The method of claim 10, and wherein l) is performed in dependence upon the $m^{th}$ write enable signal.

12. An asynchronous data buffer for transferring m data elements of a burst-transfer between two asynchronous systems, wherein m is a finite number, the asynchronous data buffer comprising:

a data input port for receiving the m data elements of a data burst from a sending system;

a data memory in communication with the data input port for storing the m data elements, wherein each data element is stored at a predetermined address location;

a valid bit memory for storing m input valid bits, wherein each input valid bit is stored at a predetermined address location corresponding to the predetermined address location of a respective data element;

input control logic circuitry in control communication with the data memory and the valid bit memory, the input control logic circuitry for determining the address locations; creating the m input valid bits, and inverting an input control signal resulting in inverting the input valid bits of a following data burst;

output control logic circuitry in communication with the data memory, the valid bit memory and a valid bit output port, the output control logic circuitry for controlling reading of the m data elements and provision of the m data elements to a receiving system creating m output valid bits based upon the m input valid bits and an output control signal, the m output valid bits for provision to the receiving system, and inverting the output control signal resulting in having the same output valid bits when processed together with the inverted input valid bits during a following data burst; and a data output port in communication with the data memory for providing the m data elements to the receiving system, wherein the receiving system and the sending system simultaneously access the data memory after storage of the first data element in the data memory.

13. The asynchronous data buffer of claim 12, further comprising:

a write enable input port in communication with the valid bit memory, the data memory, and the input control logic circuitry, the write enable input port for receiving a write enable signal from the sending system.

14. The asynchronous data buffer of claim 13, wherein the input control logic circuitry further comprises:

an input counter in communication with the write enable input port, the valid bit memory, and the data memory, the input counter for determining the address locations in dependence upon the write enable signal and for providing the input control signal.

15. The asynchronous data buffer of claim 14, and wherein the input counter further comprises:

a binary address counter.

16. The asynchronous data buffer of claim 14, and wherein the input control logic circuitry further comprises:

an input valid bit generator in communication with the write enable input port, the valid bit memory and the input counter, the input valid bit generator for creating the m input valid bits in dependence upon the write enable signal and the input control signal.

17. The asynchronous data buffer of claim 16, and wherein the input valid bit generator further comprises:

a toggle flip-flop and an XOR gate.

18. The asynchronous data buffer of claim 12, further comprising:

a valid bit multiplexer in communication with the valid bit memory and the output control logic circuitry for transmitting the m input valid bits in dependence upon a second control signal received from the output control logic circuitry.

19. The asynchronous data buffer of claim 12, further comprising:

a data multiplexer interposed between the data memory and the data output port and in communication with the output control logic circuitry for transmitting the m data elements in dependence upon the second control signal received from the output control logic circuitry for transmitting the m data elements in dependence upon the second control signal received from the output control logic circuitry.

20. The asynchronous data buffer of claim 19, further comprising:

a valid bit synchronization circuitry interposed between the valid bit memory and the valid bit multiplexer, the valid bit synchronization circuitry for synchronizing the input valid bits to a clock domain of the receiving system.

21. The asynchronous data buffer of claim 20, wherein the valid bit synchronization circuitry further comprises:
   m parallel two stage synchronizers.

22. The asynchronous data buffer of claim 20, further comprising:
   a read enable input port in communication with the output control logic circuitry, the read enable input port for receiving a read enable signal from the receiving system.

23. The asynchronous data buffer of claim 22, wherein the output control logic circuitry further comprises:
   an output counter in communication with the read enable input port, the valid bit multiplexer and the data multiplexer, the output counter for determining address locations of the m input valid bits and the m data elements in dependence upon the read enable signal and for providing the output control signal.

24. The asynchronous data buffer of claim 23, wherein the output counter further comprises:
   a binary address counter.

25. The data buffer of claim 18, wherein the output control logic circuitry further comprises:
   an output valid bit generator in communication with the valid bit multiplexer, the output counter and the valid bit output port, the output valid bit generator for creating the m output valid bits in dependence upon the m input valid bits and the output control signal.

26. The asynchronous data buffer of claim 25, wherein the output valid bit generator further comprises:
   a toggle flip-flop and an XOR gate.

* * * * *